July 1, 1952 J. PINSKY ET AL 2,601,700
APPARATUS FOR MOLDING PLASTIC BOTTLES
Filed June 20, 1950

INVENTORS
JULES PINSKY
ROBERT L. ZWEYGARTT
BY Parham + Bates
ATTORNEYS

Patented July 1, 1952

2,601,700

UNITED STATES PATENT OFFICE 2,601,700

APPARATUS FOR MOLDING PLASTIC BOTTLES

Jules Pinsky and Robert L. Zweygartt, West Hartford, Conn., assignors to Plax Corporation, West Hartford, Conn., a corporation of Delaware Application June 20, 1950, Serial No. 169,152

7 Claims. (Cl. 18—35)

The present invention relates to the printing and decorating of thermoplastic resin articles, especially blown plastic bottles and the like, during the process of their manufacture and particularly while they are being formed in shaping or forming molds.

It is a principal object of the present invention to provide apparatus by means of which printing and decorating of bottles, tubing and other molded plastic product may be more expeditiously and economically effected than by the variety of processes and apparatus heretofore employed.

A further object is to provide apparatus of the type indicated in which blown plastic bottles and the like are printed or otherwise decorated in their molds at the same time that they are blow-molded and finally shaped.

Other objects will be pointed out in or apparent from the following description of two illustrative embodiments of the invention which are shown in the accompanying drawing in which.

Figure 1:
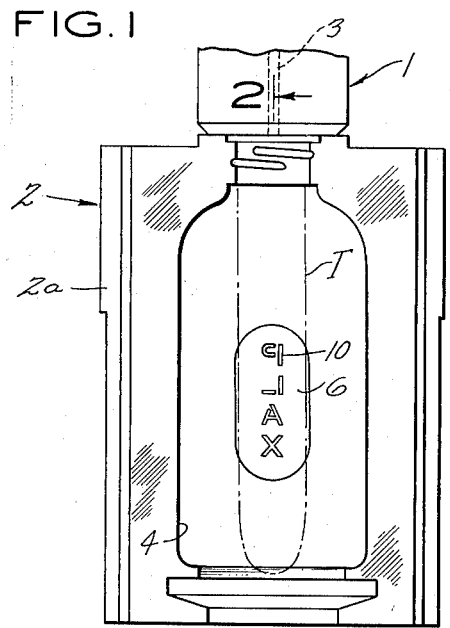
Figure 1 is a front elevation view of one section of a two-section blow mold and associated equipment embodying the invention.

Referring to the drawing, there is shown a vertically disposed extrusion head 1 from which a suitable length of thermoplastic tubing T may be extruded downwardly at preselected intervals into blow-molding position relative to a two-part mold generally designated 2, only one section 2a of which is shown in the drawing. The head 1 of course is associated with a suitable extruder (not shown) which serves to heat or otherwise plasticize a thermoplastic resin such as, for example, polyethylene and regulably force the resin from the head in tubular form and relatively homogeneous condition at preselected intervals and in predetermined like quantities.

The head 1 preferably is provided with an internal air passage 3 through which air under pressure is periodically introduced into successive lengths of tubing to blow each of them into molding engagement with the shaping wall 4 of the molding cavity in the mold section 2a. Each mold section 2a is provided with an undercut semi-circular side flange 5 by means of which they are secured to suitable mold-operating structure (not shown) for supporting and moving them between open and closed or molding positions.

Details of the mold operating mechanism and of the extruder and extrusion head 1 need not be set forth here as they are not critical and the patent to Kopitke, No. 2,349,176, issued May 16, 1944, discloses complete details of suitable apparatus which may be employed in practicing the present invention.

Figure 2:
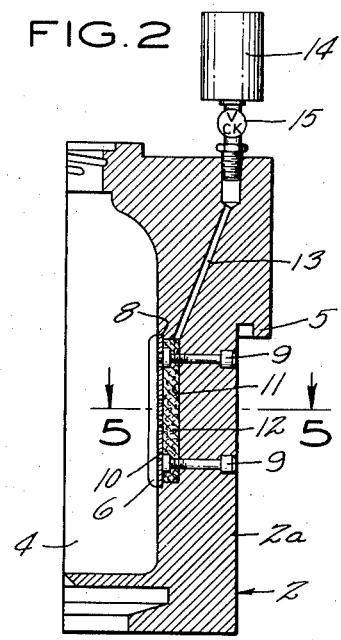
Fig. 2 is a cross-sectional view taken on line 2—2 of Fig. 1 showing details of embossing and printing structure incorporated in the blow mold.
Figure 6:
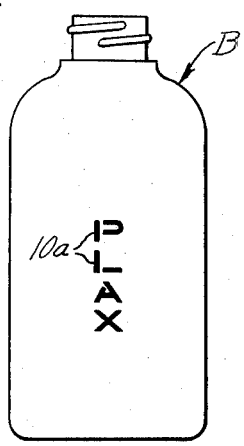
Fig. 6 is an elevation view of a blown plastic bottle which is the product of either of the two embodiments of the invention shown in Figs. 1-5.

In accordance with the invention, the mold section 2a is provided, as shown in Figs. 1 and 2, with a generally oval shaped inset plate 6 having a surface which preferably is flush with and constitutes a substantially uninterrupted continuation of the molding surface of the mold wall 4 so that, as shown in Fig. 6, the seam does not make any appreciable impression in the portion of the wall of bottle B which is molded thereagainst. However, if desired, the plate 6 may protrude or be recessed any selected amount so as to emboss the design of its configuration in the wall of the bottle B, which configuration, of course, may be of any selected design other than the oval shape shown in Fig. 1.

Figure 5:
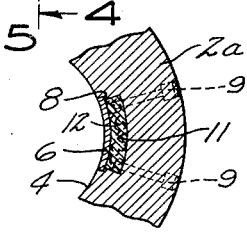
Fig. 5 is a cross-sectional view taken on line 5—5 of Fig. 2.

As shown in Fig. 5, the insert plate 6 is secured in a conforming shouldered recess 8 by bolts 9 and is pierced as at 10 with a selected designer legend, such as the trade-mark "Plax," which is inverted or "mirrored" so that the bottle B which is blown against it is embossed with the obverse mark 10a, as in Fig. 6.

A cavity 11, located rearwardly of the plate 6 in the mold section 2a, is filled with an inking pad 12 to which ink is gravity fed through a passage 13 from a supply reservoir 14 mounted on the mold section. Preferably a one-way or check valve 15 is located between the reservoir 14 and the supply passage 13.

In operation, a desired length of plastic tubing T is extruded downwardly from the extrusion head 1 and thereafter the mold sections 2a are closed thereby pinching and sealing the bottom of the tubing T and forming a bubble which thereupon is blown by air from line 3 into molding engagement with wall 4 of the mold cavity.

The internal blowing pressure forces the hot plastic film into the print or design openings 10 of the plate 6 thereby embossing the bottle B with the selected legend or ornamentation 10a. Thereupon, the hot embossed portions 10a engage the pad 12 and are permanently colored by the ink of the pad 12. The check valve 15 and the relatively incompressible nature of the liquid ink act to establish a desired counter-pressure for the air pressure which forces the bottle wall through the openings 10 into engagement with the pad 12 so that the wall does not penetrate too far and so that, should the bottle wall fail, the reservoir 14 is not emptied by the blowing air which escapes.

Figure 3:
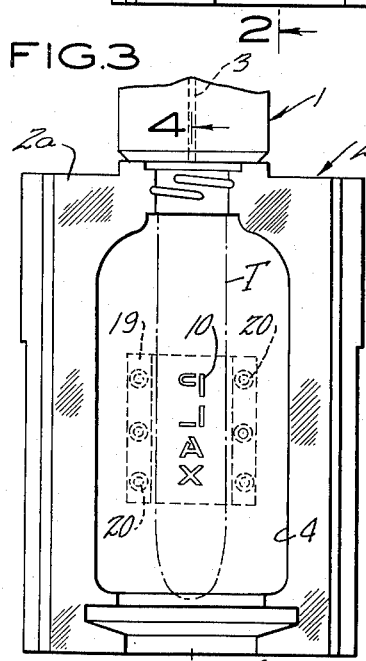
Fig. 3 is a front elevation view similar to Fig. 1 showing a second somewhat different embossing and printing structure incorporated in the blow mold.

Referring to the embodiment of the invention illustrated in Figs. 3 and 4, the blow mold and extrusion head may be, and are shown as, basically identical with the like components shown in, and heretofore described with reference to Figs. 1 and 2, and are identified by the same reference numbers. The embossing design or legend 10 (Plax) is cut in and through the wall 4 of the mold section 2a behind which is a hollow recess 11' in which ink pad 12 is located. The pad is snugly retained along its top and bottom edges within upper and lower groove portions 16 of the recess 11 so that it is retained in close surface engagement adjacent its top and bottom edges with surface 17 of the mold wall 4 through which the legend 10 is cut.

The center portion of the pad 12 also is pressed against the surface 17 by a leaf spring 18 that is located in the recess 11' rearwardly of the pad.

Figure 4:
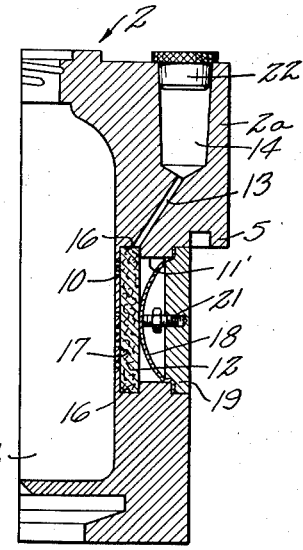
Fig. 4 is a cross-sectional view similar to Fig. 2 taken on line 4—4 of Fig. 3 showing details of the second embossing and printing structure.

As shown in Fig. 4, the spring 18 is secured at its upper and lower ends between portions of the mold section 2a and a cap plate 19 which is secured by side bolts 20 (Fig. 3) to the mold and tightly closes the rear of the recess or chamber 17. A convex center portion of the spring 18 bears on the entire width of the pad 12 so as to provide the necessary counter-pressure when the plastic wall of a bottle B, or the like, is blown against the pad. An adjustment member in the form of a screw 21 projects inwardly from the cap plate 19 to the spring 18 and prevents the center of the latter from yielding, thereby maintaining the center of the pad snugly against the adjustment surface 17 of the mold. Consequently, the pressure exerted by the blown bottle wall through the embossing openings 10 cannot force the pad 12 away from the surface 17 and create voids which might fill with ink and produce excessive and undesirable inking of the bottle B or its embossed portions 10a. Only the top of the embossed lettering 10a is contacted and colored by the ink pad 12 and no excess ink contacts the base of the lettering or the bottle proper.

The ink is supplied to the recess 11' through a passage 13 from a reservoir 14 formed in the mold and having a detachable cap 22.

It will be apparent that the portion of the recess 11' between the pad 12 and the plate 19 is kept filled with ink so that the pad 12 is automatically maintained at all times.

The two described embodiments are merely illustrative of the invention and it will be understood that changes and modifications may be made within the scope of the invention which is defined by the appended claims.

We claim:

1. In apparatus for manufacturing blown bottles and the like of thermoplastic resin material, the combination of a mold, coloring means associated with the mold, means for positioning a hollow thermoplastic preform in the mold, means for inflating and pressing the preform into shaping engagement with the mold and into coloring contact with the coloring means and means for constantly and automatically replenishing said coloring means with coloring material.

2. In apparatus for manufacturing blown bottles and the like of thermoplastic resin material, the combination of a mold wall having a shaping cavity molding surface, a coloring pad in the mold wall, means for positioning a hollow thermoplastic preform in the mold, said mold wall having passageways extending from said molding surface to said pad, and means for inflating and pressing the preform into shaping engagement with the mold surface and substantially concurrently through said passages in the mold wall into coloring contact with the coloring pad, and means for automatically and constantly replenishing said pad with coloring material.

3. In apparatus for manufacturing blown bottles and the like of thermoplastic resin material, the combination of a mold having a wall shaped to form a molding cavity surface, coloring means located adjacent the molding cavity surface of the mold wall, an embossing plate secured on said wall and overlying said coloring means, said plate being provided with an embossing opening extending from the mold cavity to the coloring means, means for positioning a hollow thermoplastic preform in the mold, and means for inflating and pressing the preform into shaping engagement with the mold cavity surface and said plate and through the embossing opening into coloring contact with the coloring means.

4. In apparatus for manufacturing blown bottles and the like of thermoplastic resin material, the combination of a mold having a wall shaped to form a molding cavity, coloring means located in the mold wall, an embossing plate provided with an opening extending from the mold cavity through the wall to the coloring means, a reservoir and line for supplying coloring material to the coloring means, a one-way valve in the line, means for positioning a hollow thermoplastic preform in the mold, and means for inflating and pressing the preform into shaping engagement with the mold and thereafter through the embossing opening into coloring contact with the coloring means.

5. In apparatus for manufacturing blown bottles and the like of thermoplastic resin material, the combination of a multi-section mold having a molding cavity therein, an embossing plate provided with an opening in a section of the mold, a recess connected by said opening with said cavity, an inking pad in said recess, a reservoir and line for supplying ink to said recess and pad, means for positioning a hollow thermoplastic preform in the mold, and means for inflating and pressing the preform into shaping engagement with the mold and through the embossing opening into coloring contact with the inking pad.

6. Apparatus as recited in claim 5 wherein said pad substantially completely fills said recess.

7. Apparatus as recited in claim 5 wherein only a portion of said recess contiguous to said cavity and said opening is filled by said pad.

JULES PINSKY.
ROBERT L. ZWEYGARTT.

REFERENCES CITED

The following references are of record in the file of this patent:

UNITED STATES PATENTS

| Number | Name | Date |
|--------|------|------|
| 259,724 | Sims | June 20, 1882 |
| 878,308 | Patesson | Feb. 4, 1908 |
| 2,175,054 | Ferngren et al. | Oct. 3, 1939 |
| 2,289,084 | Temple | July 7, 1942 |